(12) United States Patent
Theisen et al.

(10) Patent No.: US 9,584,753 B2
(45) Date of Patent: Feb. 28, 2017

(54) INTERACTIVE DISPLAY FIXTURE

(71) Applicant: Target Brands, Inc., Minneapolis, MN (US)

(72) Inventors: Jennifer A. Theisen, Crystal, MN (US); Alex K. Poniatowski, Brooklyn Park, MN (US)

(73) Assignee: Target Brands, Inc., Minneapolis, MN (US)

( * ) Notice: Subject to any disclaimer, the term of this patent is extended or adjusted under 35 U.S.C. 154(b) by 38 days.

(21) Appl. No.: 14/714,707

(22) Filed: May 18, 2015

(65) Prior Publication Data

US 2016/0344971 A1    Nov. 24, 2016

(51) Int. Cl.
*H04N 5/655* (2006.01)
*H04N 5/225* (2006.01)
*H04N 9/87* (2006.01)

(52) U.S. Cl.
CPC ............ *H04N 5/655* (2013.01); *H04N 5/2253* (2013.01); *H04N 9/87* (2013.01)

(58) Field of Classification Search
None
See application file for complete search history.

(56) References Cited

U.S. PATENT DOCUMENTS

| | | | |
|---|---|---|---|
| 7,204,376 B2 | 4/2007 | Richardson et al. | |
| 7,571,823 B2 | 8/2009 | Richardson et al. | |
| 8,007,059 B2 | 8/2011 | Karl et al. | |
| 8,800,817 B2 | 8/2014 | Norris et al. | |
| 2001/0030660 A1 | 10/2001 | Zainoulline | |
| 2002/0084389 A1 | 7/2002 | Larson | |
| 2005/0088407 A1 | 4/2005 | Bell et al. | |
| 2007/0034694 A1* | 2/2007 | Jensen | G07F 9/02 235/439 |
| 2011/0106653 A1 | 5/2011 | Wein | |
| 2011/0112913 A1 | 5/2011 | Murray | |
| 2011/0141001 A1 | 6/2011 | Yoshida et al. | |
| 2012/0120214 A1 | 5/2012 | Faranda et al. | |
| 2013/0106682 A1 | 5/2013 | Davis et al. | |
| 2014/0164190 A1 | 6/2014 | Schiffman et al. | |
| 2015/0002388 A1 | 1/2015 | Weston et al. | |
| 2016/0134930 A1* | 5/2016 | Swafford | A47F 5/0846 725/80 |

* cited by examiner

*Primary Examiner* — Kristy A Haupt
(74) *Attorney, Agent, or Firm* — Leanne Taveggia Farrell; Westman, Champlin & Koehler, P.A.

(57) ABSTRACT

An interactive display fixture includes an upper component mounted to a back wall and has a front panel. The front panel of the upper component includes at least one opening that surrounds a motion sensing system that is mounted to the back wall. A display table is also mounted to the back wall, located directly below the upper component, and includes a curved upper surface, a front side, a back side and a plurality of recesses having recessed surfaces that are recessed from the curved upper surface and located in proximity to the front side of the display table. The plurality of recesses are sized and shaped to receive respective corresponding sized tester products, which the motion sensing system senses.

20 Claims, 9 Drawing Sheets

INTERACTIVE DISPLAY FIXTURE

BACKGROUND

Projection-based motion sensing systems incorporate a video camera that feeds or streams an image in real time, an infrared projector located alongside the video camera for sensing depth and a microchip to track the movement of objects and individuals in three dimensions. The signals generated by the camera, the projector and the microchip are processed by a computer using computer vision techniques. These projection-based motion sensing systems enable a user to control and interact with a computer using gestures and spoken commands without the need for a handheld controller.

The discussion above is merely provided for general background information and is not intended to be used as an aid in determining the scope of the claimed subject matter.

SUMMARY

An interactive display fixture includes an upper component mounted to a back wall and having a front panel. The front panel of the upper component includes at least one opening that surrounds a motion sensing system that is mounted to the back wall. A display table is mounted to the back wall, located directly below the upper component, and includes a curved upper surface, a front side, a back side and a plurality of recesses having recessed surfaces that are recessed from the curved upper surface and located in proximity to the front of the display table. The plurality of recesses are sized and shaped to receive correspondingly sized tester products, which the motion sensing system senses.

A method of displaying products on an interactive display fixture is provided. A display table is mounted to a back wall. The display table is cantilevered from the back wall and includes a curved upper surface and a plurality of recesses recessed from the curved upper surface that are located closer to a front of the display table than a back of the display table. Tester products are set in the plurality of recesses that are recessed from the curved upper surface on a display table. The recesses are sized and shaped to correspond with the tester products. Purchasable products are positioned on at least one shelf located below the display table. The purchasable products correspond with the tester products located in the recesses in the display table.

An interactive display fixture includes a display table mounted to a back wall and includes a curved upper surface, a front side and a back side. The curved upper surface prevents objects from being left thereon. A plurality of recesses have recessed surfaces that are recessed from the curved upper surface, are spaced apart from the front side and are located closer to the front side than the back side. The recessed surfaces of the plurality of recesses include a substantially flat surface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

An interactive display fixture includes a back wall that supports a motion sensing system and a video display screen. The interactive display fixture further includes a display table also mounted to the back wall and being cantilevered from the back wall. The display table includes a curved upper surface and a plurality of recesses recessed from the curved upper surface on which tester products are set upright and are located proximal to a front end of the display table. Each tester product sits in a recess that is sized and shaped to correspond with the shape of the tester product. The tester products are free to be handled by a customer without impediment and are monitored by the motion sensing system.

In operation, the motion sensing system senses a customer and the tester product the customer has lifted and will play back content on the video display screen that corresponds with that product. Any item that is set on the curved surface of the display table will roll off or otherwise slide off. This ensures the customer will put the tester product back in the recess from which it was taken so that the motion sensing system can continue to identify movement of that tester product and also keeps the line of sight from motion sensing system to the tester product unobstructed.

Figure 1:
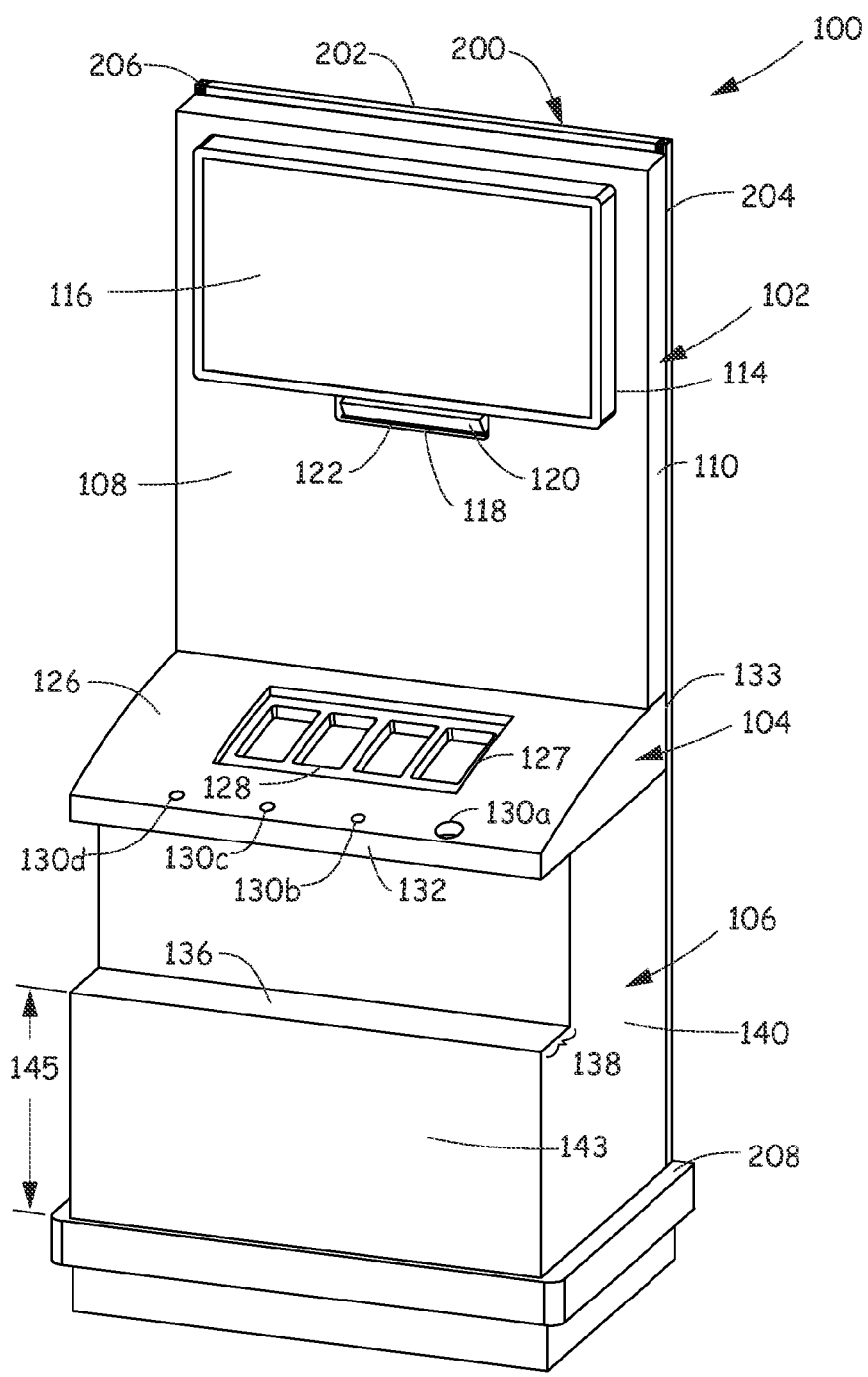
FIG. 1 is a perspective view of an interactive display fixture according to one embodiment.
Figure 2:
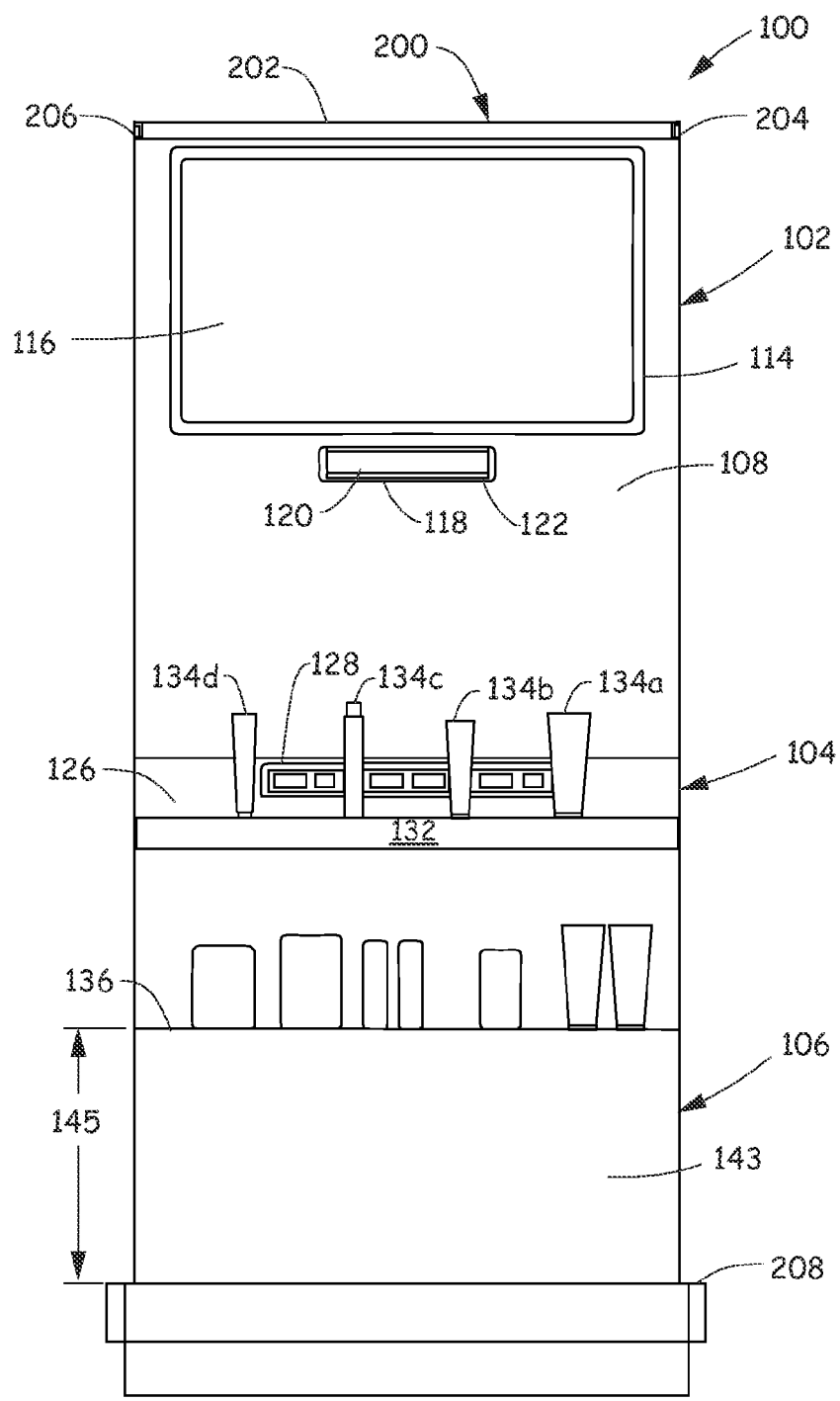
FIG. 2 is a front view of the interactive display fixture in FIG. 1.
Figure 3:
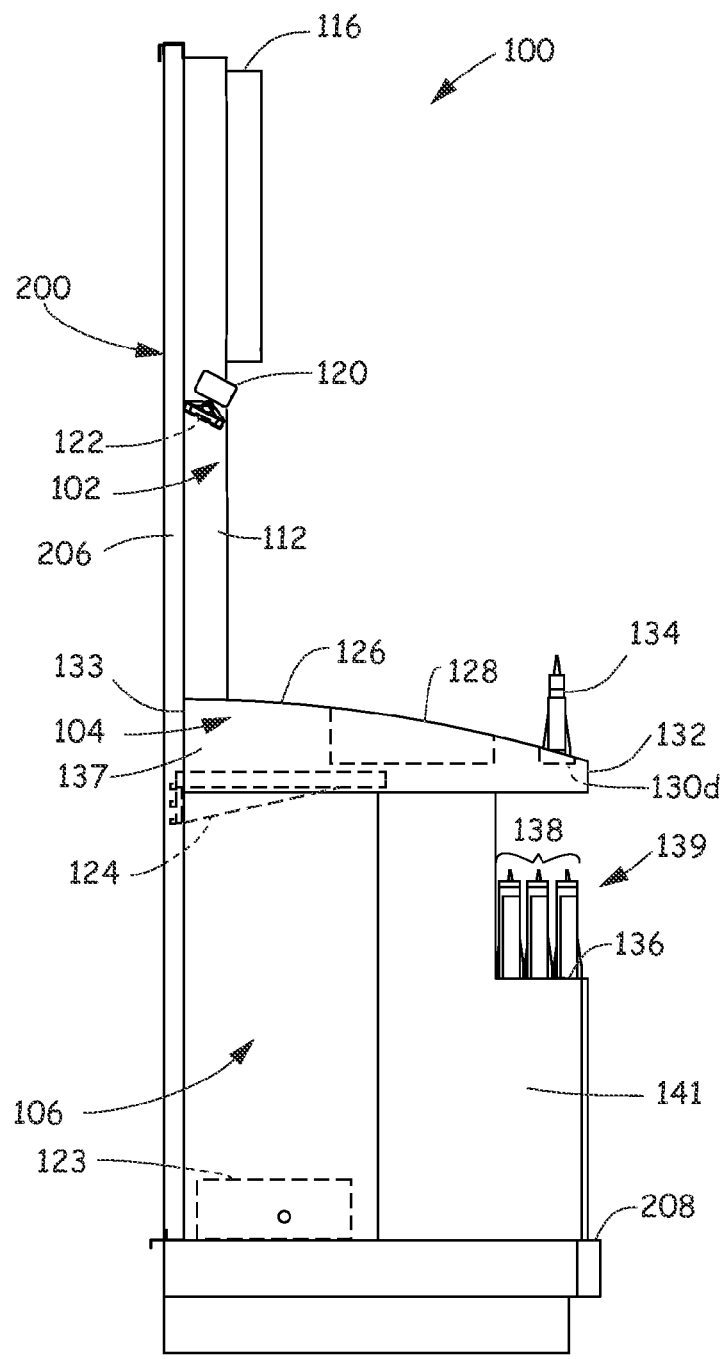
FIG. 3 is a left side view of the interactive display fixture in FIG. 1.

FIG. 1 is a perspective view of an interactive display fixture 100 according to one embodiment. FIG. 2 is a front view of interactive display fixture 100 with tester products, sample products and products to be purchased on display and FIG. 3 is a left side view of interactive display fixture 100 (the right side view being a mirror image of the left side view) with tester products, sample products and products to be purchased on display. In one embodiment, interactive display fixture 100 is located on an end display in a retail store. While an end display can be any type of structure that exists at an end of an aisle in a business or retail store, in one embodiment and as illustrated, the end display illustrated in FIGS. 1-3 is an endcap of a gondola. A gondola is a freestanding display fixture used to display products and merchandise. Gondolas include flat, substantially horizontal bases or base decks and a substantially vertical back wall supported by a pair of slotted uprights. The substantially vertical back wall can feature notches, pegboards and/or slat walls. In addition, the vertical back wall can be fitted with shelves, peg hooks or other display components. Gondolas placed side-by-side form rows that define aisles. In the embodiment described herein, a vertical back wall 202 of a gondola 200 supported by a pair of slotted uprights 204 and 206 is placed at an end of a row of side-by-side gondolas to be used as an end display having an end or base deck 208.

As illustrated in FIGS. 1-3, interactive display fixture 100 includes an upper component 102, a middle component 104 and a lower component 106. Lower component 106 is supported by end or base deck 208, middle component 104 is mounted to and supported by the pair of uprights 204 and 206 of back wall 202 and upper component 102 is mounted to and supported by the pair of uprights 204 and 206 of back wall 202. Upper component 102 is a three panel structure coupled together by bends in a material, such as sheet metal and the like, and includes a front panel 108, a left side panel 110 and a right side panel 112. Front panel 108 includes a plurality of openings. A first opening 114 surrounds a video display screen 116 that is part of interactive display fixture 100 and is mounted to back wall 202 of gondola 200. A second opening 118 is located below first opening 114 and surrounds a motion sensing system 120 that is part of interactive display fixture 100 and is mounted to back wall 202 with a specialized mount 122. Although the embodiment illustrated in FIGS. 1-3 shows upper component 102 having two openings it should be realized that upper component 102 can have any number of openings including a single opening. While interactive display fixture 100 includes a video display screen 116 separate from motion sensing system 120, it is possible that both components could be packaged together and only one opening in front panel 108 be needed.

Middle component 104 is a display table mounted to and supported by, as described above, the pair of uprights 204 and 206 of back wall 202 with a pair of brackets. One of the brackets—a left side bracket 124—is illustrated in phantom in FIG. 3. In this way, middle component or display table 104 is located directly below upper component 102 and is cantilevered from back wall 202 of gondola 200. Display table 104 includes a curved upper surface 126, an opening 127 for receiving a recessed inset 128 that recesses from curved upper surface 126 and a plurality of tester product recesses 130a, 130b, 130c and 130d also recessed from curved upper surface 126 and located in proximity to a front side 132 of display table 104. More specifically, recesses 130a-d are spaced apart from front side 132, but located closer to front side 132 than a back side 133 of display table 104. In addition, recessed inset 128 is located between recesses 130a-d and back side 133.

Tester product recesses 130a-d are sized and shaped to correspond with the shape of the corresponding tester products each recess 130a-d holds. Recessed inset 128, on the other hand, displays samples of products 147a-d (FIG. 4) of each of the tester products 134a, 134b, 134c and 134d that are located in recesses 130a-d. Further description of display table 104 will be discussed in detail below in regards to the operation of interactive display fixture 100.

Lower component 106 is a shelf unit for holding and displaying actual products for purchase 139 that correspond to the tester products 134a-d located in recesses 130a-d and that correspond with the sample products 147a-d on display in recessed inset 128. Lower component or shelf unit 106 is located below display table 104. In the embodiment illustrated in FIGS. 1-3, shelf unit 106 includes a single shelf 136 having a shortened shelf depth 138, which limits the amount of stock that can be set. This is in part due to the products that are being offered for sale are more expensive than other products being sold in the store and with more products available for purchasing the more possibility there is for products to be stolen. However, it is possible for shelf unit 106 to be of other configurations including having more than one shelf and having shelf depths that are greater or smaller in size.

Shelf unit 106 includes a right side panel 140, a left side panel 141 and a front panel 143. Front panel 143 has a height 145. Height 145 is less than the height of right side panel 140 and left side panel 141 and defines a height of shelf 136 relative to base deck 208. In addition, a front of shelf 136 corresponds with front panel 143 of shelf unit 106. Front panel 143 is in alignment with front side 132 of display table 104. Depth 138 of shelf 136 is less than a depth of display table 104. Together right side panel 140, left side panel 141 and front panel 143 hide a computer or processing unit 123 where signals generated by motion sensing system 120 are processed using computer vision techniques.

Figure 4:
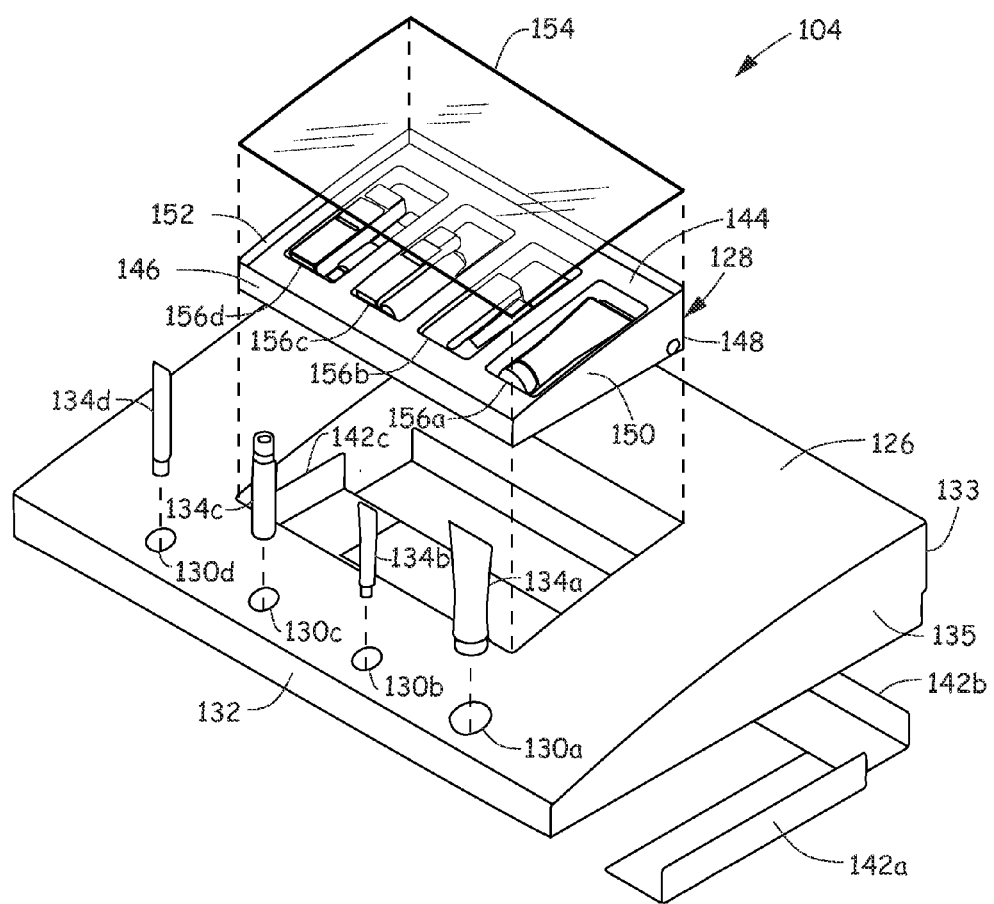
FIG. 4 is an exploded perspective view of a display table of the interactive display fixture in FIGS. 1-3 including sample products and tester products on display.
Figure 5:
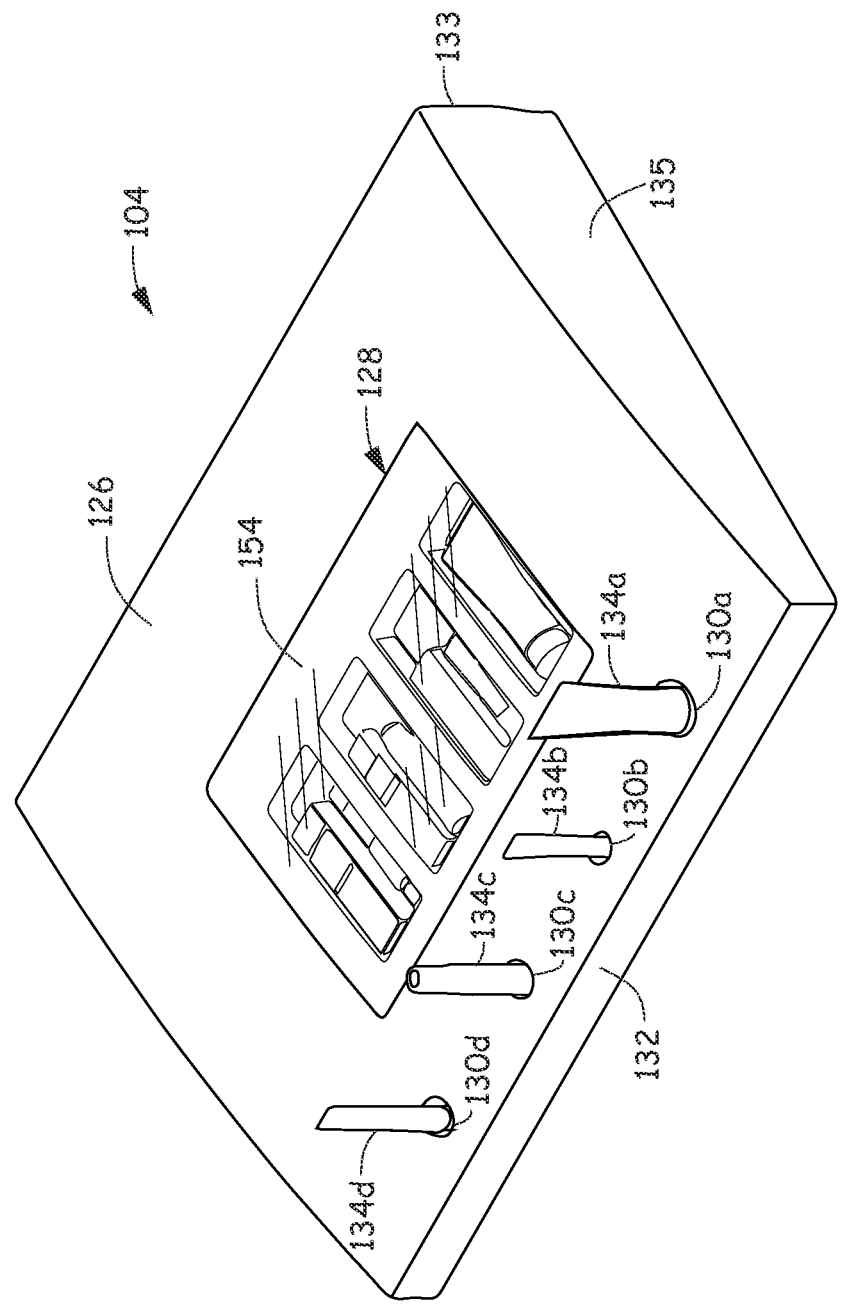
FIG. 5 is an assembled perspective view of the display table in FIG. 4.
Figure 6:
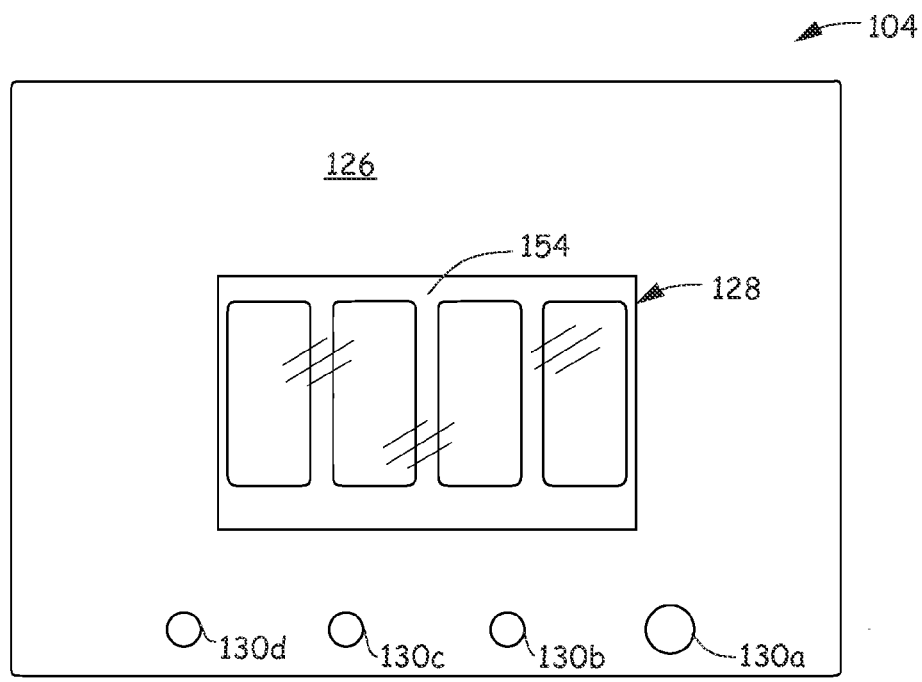
FIG. 6 is a top view of the display table in FIG. 5 with sample and tester products removed.
Figure 7:
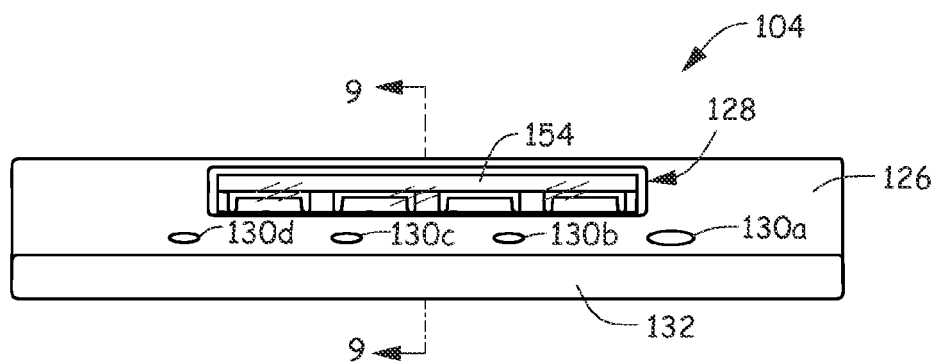
FIG. 7 is a front view of the display table in FIG. 6.
Figure 8:
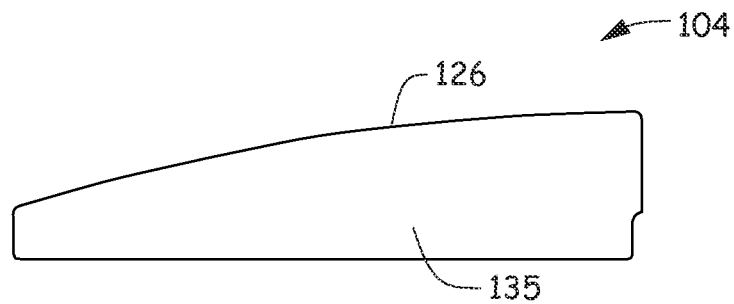
FIG. 8 is right side view of the table in FIG. 6.
Figure 9:
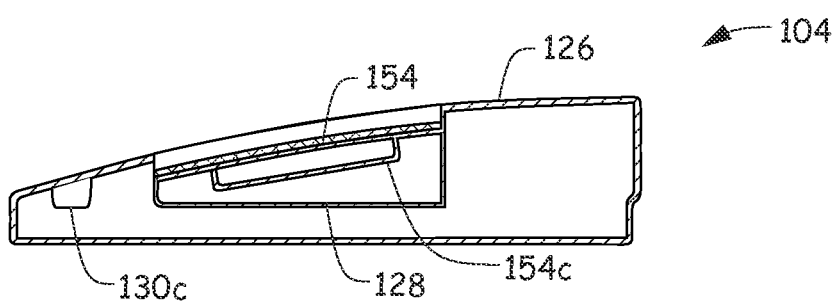
FIG. 9 is section view of the display table in FIG. 6 taken through the line indicated in FIG. 7.

FIG. 4 illustrates an exploded perspective view of display table 104 with sample products and tester products on display. FIG. 5 illustrates an assembled perspective view of display table 104. FIG. 6 illustrates a top view of FIG. 5 with sample products and tester products removed. FIG. 7 illustrates a front view of FIG. 6. FIG. 8 illustrates a right side view of FIG. 6 (the left side view being a minor image) with sample products and tester products removed and FIG. 9 illustrates a section view of FIG. 5 taken through the line indicated in FIG. 7.

As previously discussed, display table 104 includes curved upper surface 126, front side 132, back side 133, recessed inset 128 and recesses 130a-d for supporting tester products 134a-d. More specifically, each recess 130a-d includes a recessed surface that is substantially flat so that tester products 134a-d can rest and sit in recesses 130a-d on the flat recessed surface in a substantially straight position. Display table 104 further includes opening 127 that extends from curved upper surface 126 to a bottom of display table 104. Still further, display table 104 includes a plurality of plates 142a, 142b and 142c for mounting display table 104 to a pair of shelf brackets of which one shelf bracket 124 is shown in phantom in FIG. 3. Opening 127 surrounds and receives recessed inset 128. Still further, front side 132 is a front panel and display table 104 also includes a right side panel 135 and a left side panel 137 (FIG. 3). The bottom edges of each of front panel 132, right side panel 135 and left side panel 137 are in a single plane with each other so as to hide the components under display table 104 for mounting display table 104 to back wall 202 of gondola 200.

Although recessed inset 128 is illustrated as being separable from display table 104 in FIG. 4, it should be realized that recessed inset 128 can also be formed continuous with display table 104. Other options include coupling recessed inset to display table 104 using fasteners, adhesive and the like. Recessed inset 128 includes a profile that is similar to display table 104. In particular, a top surface 144 of inset 128, which is recessed from front, back and side top edges of recessed inset 128, has a curved surface that corresponds to curved upper surface 126 of display table 104. A front side 146 of inset 128 corresponds to front side 132 of display table 104. A back side 148 of inset 128 corresponds to back side 133 of display table 104. A right side 150 of inset 128 corresponds to right side 135 of display table 104 and left side 152 of inset 128 corresponds to left side 137 of display table 104. Inset 128 further includes a transparent top cover 154. Like top surface 144, top cover 154 has a curved contour so that it can fit snuggly against the curved top surface 144 of inset 128. Still further, inset 128 includes a plurality of recesses 156a, 156b, 156c and 156d that correspond with the amount of recesses 130a-d that are in display table 104 and are recessed from curved top surface 144. Recesses 156a-d house sample products 147a-d that correspond with the tester products 134a-d located in recesses 130a-d. For example, the sample product located in recess 156a corresponds with tester product 134a located in recess 130a. The sample product located in recess 156b corresponds with tester product 134b located in recess 130b. The sample product located in recess 156c corresponds with tester product 134c in recess 130c. The sample product located in recess 156d corresponds with tester product 134d in recess 130d.

Figure 10:
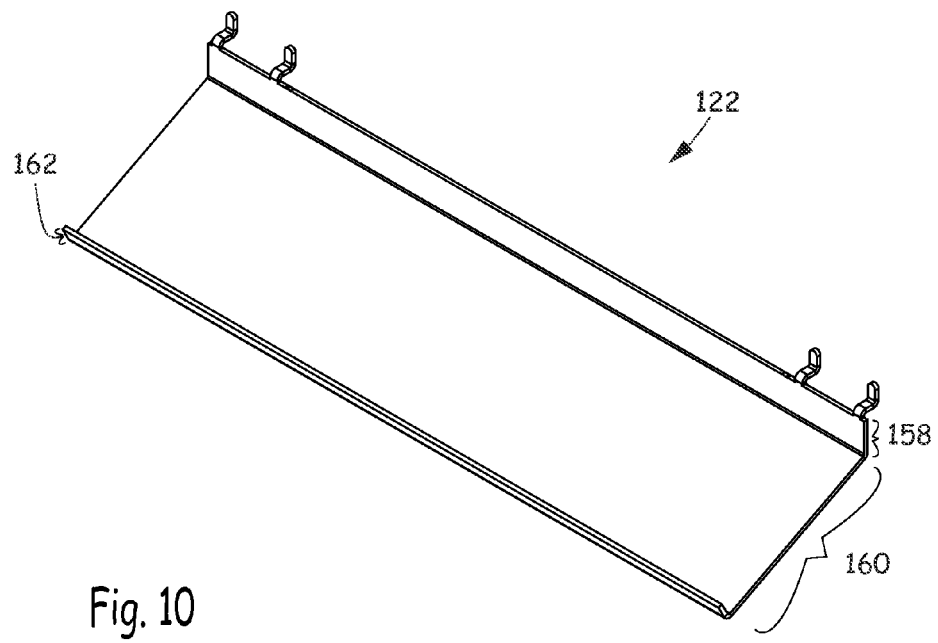
FIG. 10 is a perspective view of a mount for holding a projection-based interactive system illustrated in FIGS. 1-3.
Figure 11:
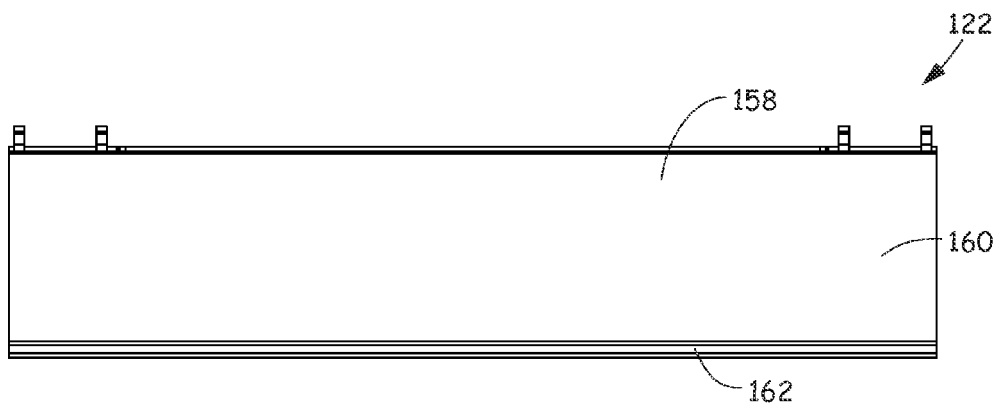
FIG. 11 is a top view of the mount in FIG. 10.
Figure 12:
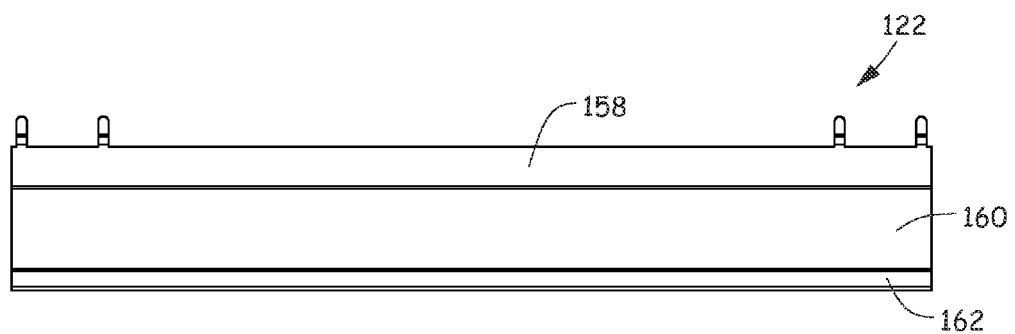
FIG. 12 is a front view of the mount in FIG. 10.
Figure 13:
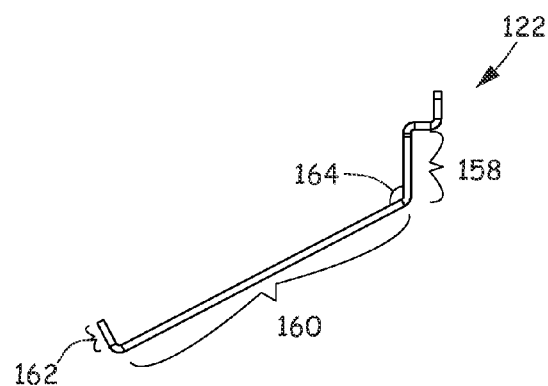
FIG. 13 is a right side view of the mount in FIG. 10.

As previously mentioned, interactive display fixture 100 includes specialized mount 122 mounted to back wall 202 and support projection-based motion sensing system 120. FIG. 10 illustrates a perspective view of specialized mount 122. FIG. 11 is a top view, FIG. 12 is a front view and FIG. 13 is a right side view (a left side view being a mirror image) of specialized mount 122. As illustrated, mount 122 includes a back section 158, a tray section 160 and a front lip 162. As best shown in FIGS. 10 and 13, back section 158 of mount 122 is oriented substantially vertical and tray section 160 is sloped at an angle 164 relative to back section 158. Angle 164 is greater than 90 degrees and less than 180 degrees. Front lip 162 is oriented substantially perpendicular to tray section 160. Mount 122 further includes a plurality of prongs 166 that protrude from back section 158 and include a substantially horizontal component coupled to back section 158 and a substantially vertical component coupled to the horizontal component and being substantially perpendicular to the substantially horizontal component. Prongs 166 are insertable into holes in a pegboard of back wall 202.

In operation, projection-based motion sensing system 120, which is enclosed in a housing, is placed on tray section 160 of mount 122 whether mount 122 has been mounted to back wall 202 or whether mount 122 has yet to be mounted to back wall 202. Front lip 162 prevents projection-based motion sensing system 120 from falling forward and tray section 160 allows projection-based motion sensing system to be angled so that projection-based sensing system 120 can sense tester products 134a-d located in recesses 130a-d as well as sense a customer and when that customer picks up one of the tester products for either testing or for inspection.

After sensing a change in the three-dimensional spatial presence of tester products 134a-d, projection-based motion sensing system 120 instructs the video display screen to playback video regarding the tester product that is being held by or tested by the customer. Because tester products 134a-d are free to be handled without being connected to display table 104 by, for example, a tether, it is important that tester products 134a-d are placed back in their respect recesses 130a-d. Curved upper surface 126 prevents items from being placed on top of display table 104 without rolling off. This ensures that not only is the line of sight from projection-based motion sensing system 120 always clear to sense tester products 134a-d because a customer cannot set random objects on curved upper surface 126, but curved upper surface 126 ensures that tester products 134a-d cannot also be set on curved upper surface 126 and must be placed back into their respective recesses 130a-d.

To display products on interactive display fixture 100, display table 104 is mounted to uprights 204 and 206 of back wall 202. Tester products 134a-d are set in the plurality of recesses 130a-d. Recesses 130a-d are sized and shaped to correspond with tester products 134a-d. Purchasable products 139 (as illustrated in FIGS. 2 and 3) are positioned on shelf 136 of interactive display fixture 100 located below display table 104. The purchasable products 139 correspond with tester product 134a-d in recesses 130a-d. Sample products 147a-d correspond to each of tester products 134a-d and are placed in recessed inset 128.

Further, video display screen 116 and projection-based motion sensing system 120 are mounted to back wall 202. Projection-based motion sensing system 120 is mounted to back wall 202 with mount 122. Upper component 102 is also mounted to back wall 202 and above display table 104 so that video display screen extends through first opening 114 and projection-based motion sensing system 120 extends through second opening 118.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An interactive display fixture comprising:
   an upper component mounted to a back wall and having a front panel, wherein the front panel of the upper component includes at least one opening that surrounds a motion sensing system that is mounted to the back wall; and
   a display table mounted to the back wall, located directly below the upper component, and including a curved upper surface, a front side, a back side and a plurality of recesses having planar recessed surfaces that are recessed from the curved upper surface and located in proximity to the front side of the display table, the plurality of recesses being sized and shaped to receive correspondingly sized tester products which the motion sensing system senses.

2. The interactive display fixture of claim 1, wherein the recessed surfaces of the plurality of recesses are substantially flat so that the tester products sit substantially straight in the recessed surfaces.

3. The interactive display fixture of claim 1, further comprising a shelf unit supported on a base deck and being located below the display table and having at least one shelf for holding purchasable products that correspond with the tester products.

4. The interactive display fixture of claim 3, wherein the shelf unit comprises a right side panel, a left side panel and a front panel having a height that is less than a height of the right side panel and the left side panel, wherein the height of the front panel defines a height of the at least one shelf.

5. The interactive display fixture of claim 4, wherein a front of the shelf that corresponds with the front panel of the shelf unit is in alignment with the front side of the display table and wherein the shelf includes a depth that is less than a depth of the display table.

6. The interactive display fixture of claim 1, wherein the display table further comprises a recessed inset recessed from the curved upper surface of the display table and being located between the back side and the plurality of recesses that hold the tester products.

7. The interactive display fixture of claim 6, wherein the recessed inset includes a curved top surface that matches the curved upper surface of the display table, a number of recesses that are recessed from the top surface and a curved transparent cover in contact with the curved top surface, wherein the number of recesses in the recessed inset corresponds with a number of the recesses that receive tester products so that sample products of a corresponding tester product are held in each of the recesses in the recessed inset.

8. The interactive display fixture of claim 1, wherein the motion sensing system is mounted to the back wall with a mount, wherein the mount includes a back section, a tray section and a front lip.

9. The interactive display fixture of claim 8, wherein the back section of the mount is oriented substantially vertical, the tray section is sloped at an angle from the back section that is greater than 90 degrees and less than 180 degrees and the front lip is oriented substantially perpendicular to the tray section.

10. The interactive display fixture of claim 8, wherein the mount further comprises a plurality of prongs that protrude from the back section and are insertable into holes in a pegboard of the back wall.

11. A method of displaying products on an interactive display fixture, the method comprising:
    mounting a display table to a back wall, the display table being cantilevered from the back wall and including a curved upper surface and a plurality of recesses recessed from the curved upper surface to planar recessed surfaces that are located closer to a front of the display table than a back of the display table;
    setting tester products on the planar recess surfaces of the plurality of recesses recessed from the curved upper surface on a display table, wherein the recesses are sized and shaped to correspond with the tester products; and
    positioning purchasable products on at least one shelf located below the display table, wherein the purchasable products correspond with the tester products located in the recesses in the display table;
    wherein the curved upper surface of the display table is incapable of supporting the tester products so a customer is forced to return the tester products to one of the planar recessed surfaces of the plurality of recesses recessed from the curved upper surface.

12. The method of claim 11, further comprising placing sample products corresponding to each of the tester products located in the plurality of recesses into a recessed inset in the display table that is located between the plurality of recesses and the back of the display table.

13. The method of claim 12, further comprising mounting a video display screen to the back wall so that the video display screen extends through the at least one opening in the front panel of the upper component.

14. The method of claim 12, further comprising mounting a motion sensing system to the back wall with a mount so that the motion sensing system is extends through the at least one opening in the front panel of the upper component.

15. The method of claim 11, further comprising mounting an upper component to the back wall above the display table, the upper component including a front panel and at least one opening in the front panel.

16. An interactive display fixture comprising:
    a display table mounted to a back wall and comprising:
        a curved upper surface, a front side, and a back side, the curved upper surface preventing objects from being left thereon; and
        a plurality of recesses having planar recessed surfaces that are recessed from the curved upper surface, are spaced apart from the front side and are located closer to the front side than the back side; and
        wherein the recessed surfaces of the plurality of recesses include a substantially flat surface.

17. The interactive display fixture of claim 16, wherein the plurality of recesses are sized and shaped to receive respectively sized tester products.

18. The interactive display fixture of claim 16, further comprising an upper component mounted to the back wall above the display table and having a front panel, wherein the front panel of the upper component includes a first opening that surrounds a video display screen that is mounted to the back wall and a second opening that surrounds a motion sensing system that is mounted to the back wall.

19. The interactive display fixture of claim 18, further comprising a mount that supports the motion sensing system on the back wall, the mount including a back section, an angled tray section and a front lip.

20. The interactive display fixture of claim 16, wherein the display table further comprises a recessed inset recessed from the curved upper surface of the display table and being located between the back side of the display table and the plurality of recesses that are shaped to receive the tester products.

* * * * *